(12) United States Patent
Moon et al.

(10) Patent No.: US 11,984,706 B2
(45) Date of Patent: May 14, 2024

(54) INTERLOCK STRUCTURE OF BYPASS TRANSFER SWITCHING DEVICE

(71) Applicant: O-SUNG ELECTRIC MACHINERY CO., LTD., Paju-si (KR)

(72) Inventors: Sunghwan Moon, Seoul (KR); Shin-o Hwang, Paju-si (KR)

( * ) Notice: Subject to any disclaimer, the term of this patent is extended or adjusted under 35 U.S.C. 154(b) by 265 days.

(21) Appl. No.: 17/503,323

(22) Filed: Oct. 17, 2021

(65) Prior Publication Data

US 2022/0239074 A1 Jul. 28, 2022

(30) Foreign Application Priority Data

Jan. 28, 2021 (KR) .......................... 10-2021-0012495

(51) Int. Cl.
*H02B 1/14* (2006.01)

(52) U.S. Cl.
CPC ...................................... *H02B 1/14* (2013.01)

(58) Field of Classification Search
CPC ........ H01H 31/00; H01H 31/04; H01H 31/06; H01H 31/08; H01H 33/00; H01H 33/46; H01H 33/48; H01H 33/50; H01H 2009/00; H01H 2009/20; H01H 2009/267; H01H 2221/00; H01H 2221/052; H01H 3/00; H01H 3/22; H01H 3/227; H01H 9/00; H01H 9/045; H01H 9/20; H01H 9/22; H01H 9/223; H01H 9/24; H01H 21/00; H01H 21/02; H01H 21/04; H01H 21/06; H02B 1/00; H02B 1/01; H02B 1/12; H02B 1/14

USPC ........................................................ 200/50.01
See application file for complete search history.

(56) References Cited

U.S. PATENT DOCUMENTS

| 6,291,783 B1 * | 9/2001 | Nebon ................... H02B 11/10 |
| | | 200/50.26 |
| 7,019,229 B1 * | 3/2006 | Weister ................ H02B 11/133 |
| | | 200/50.01 |

FOREIGN PATENT DOCUMENTS

| JP | S62-165819 A | 7/1987 |
| KR | 10-2006-0035103 A | 4/2006 |
| KR | 10-0844202 B1 | 6/2008 |
| KR | 10-1073681 B1 | 10/2011 |
| WO | 2018/207957 A1 | 11/2018 |

* cited by examiner

*Primary Examiner* — Anthony R Jimenez (57) ABSTRACT

An interlock structure of a bypass transfer switching device is proposed. When supply power is bypassed through a bypass switch, a lever input portion is closed to prevent manual switching of an automatic transfer switch, and when the automatic transfer switch is drawn from a switchboard, the closed lever input portion is automatically opened. The interlock structure includes: the automatic transfer switch having the lever input portion of a through hole shape for the manual switching of a normal supply and an alternative supply; the bypass switch configured to bypass electric power of the normal supply or the alternative supply supplied to a load side through the automatic transfer switch, the bypass switch including a bypass lever capable of manually changing a bypass circuit; and an interlock device configured to automatically close the lever input portion when the bypass lever is operated.

6 Claims, 10 Drawing Sheets

INTERLOCK STRUCTURE OF BYPASS TRANSFER SWITCHING DEVICE

CROSS REFERENCE TO RELATED APPLICATION

The present application claims priority to Korean Patent Application No. 10-2021-0012495, filed Jan. 28, 2021, the entire contents of which is incorporated herein for all purposes by this reference.

BACKGROUND OF THE INVENTION

Field of the Invention

The present disclosure relates generally to an interlock structure of a bypass transfer switching device and, more particularly, to an interlock structure of a bypass transfer switching device, the interlock structure being capable of physically preventing manual switching of an automatic transfer switch when supply power is bypassed and capable of automatically opening a lever input portion of the automatic transfer switch drawn from a switchboard.

Description of the Related Art

In general, a large building or a factory receives a normal supply from a source of a power supply such as Korea Electric Power Corporation. When an abnormality like a power outage occurs in the normal supply, the above facilities generate an alternative supply using a power generator provided inside. In a large building or the factory, an automatic transfer switching device including an automatic transfer switch (ATS) is provided to supply electric power to a load side by connecting the normal supply to the load side in normal times and to supply emergency electric power to the load side by connecting the alternative supply to the load side when an abnormality occurs in a source of the normal supply. The automatic transfer switching device consists of automatic transfer switches connected to each other in parallel. When an error occurs in one of the automatic transfer switches, the automatic transfer switching device performs switching to supply a power supply through another automatic transfer switch arranged in parallel. Accordingly, the automatic transfer switching device is provided as a bypass transfer switching device so that maintenance, testing, etc. of an automatic transfer switch with an error may be efficiently performed.

Figure 1:
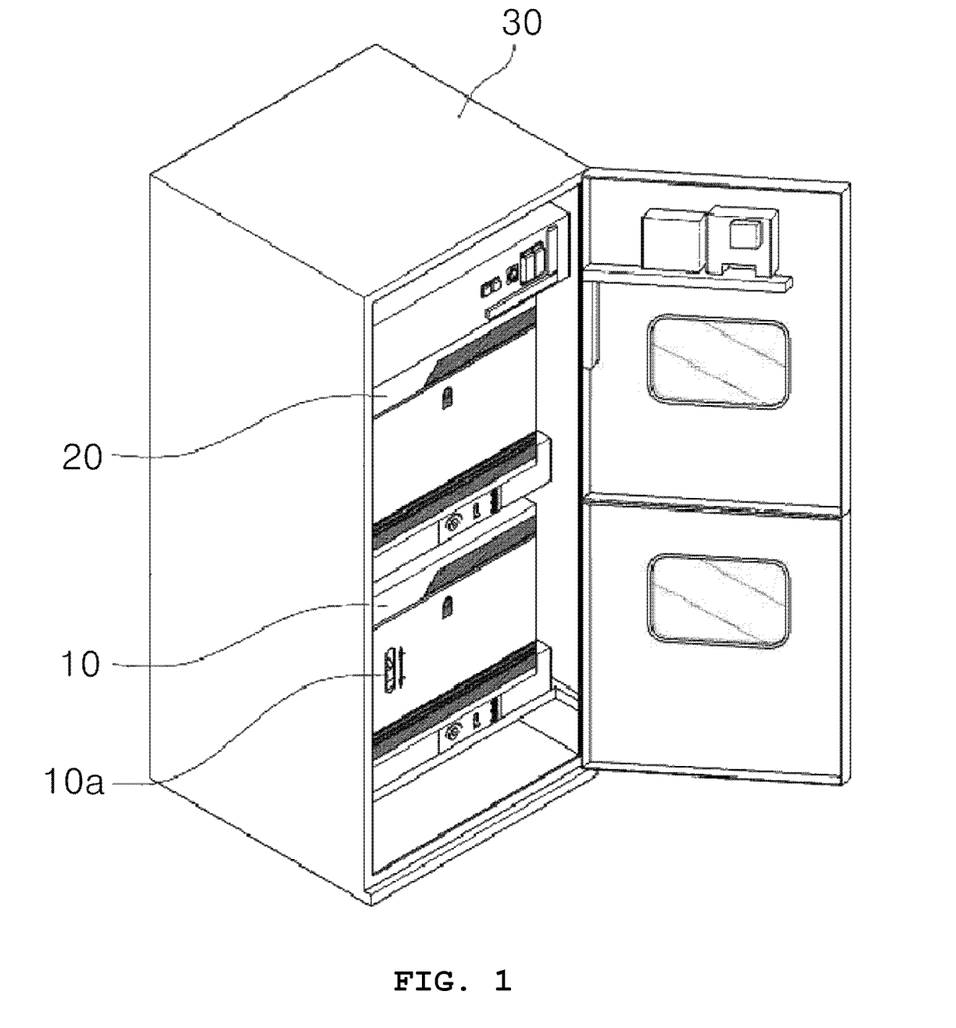
FIG. 1 is a view showing a bypass transfer switching device.
Figure 2:
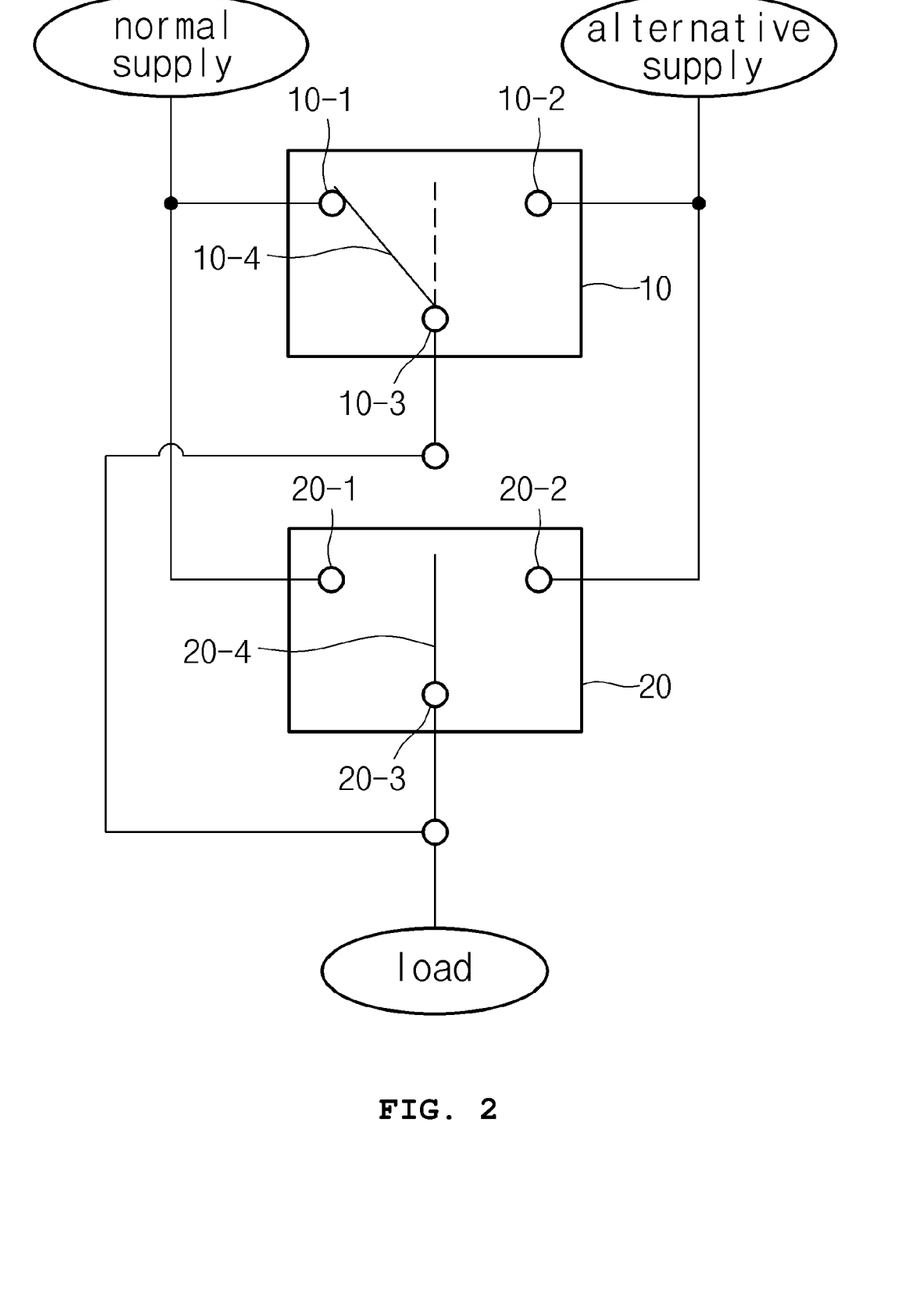
FIG. 2 is a view showing a circuit structure of the bypass transfer switching device.

As shown in FIG. 1, the bypass transfer switching device has an automatic transfer switch 10 and a bypass switch 20 in a switchboard 30. As shown in FIG. 2, at an fixed terminal portion of each switch 10, 20, a normal supply terminal 10-1, 20-1 provided to supply the normal supply and an alternative supply terminal 10-2, 20-2 provided to supply the alternative supply, and a load terminal 10-3, 20-3 provided to supply a power supply to the load supply are wired in parallel connection, so that a moving terminal 10-4, 20-4 provided at the switch 10, 20 performs switching of the power supply terminal 10-1, 10-2, 20-1, and 20-2. As shown in FIG. 1, a lever input portion 10a is provided at a front surface of the automatic transfer switch 10 and administrator inputs a lever to the lever input portion 10a, thereby manually switching a power supply of the automatic transfer switch 10. Meanwhile, when maintenance, repair, or testing of the automatic transfer switch 10 is required, the bypass transfer switching device performs switching so that a power supply is supplied without a cut-off to the load side through the bypass switch 20. Therefore, maintenance, repair, or testing of the automatic transfer switch 10 may be efficiently performed.

However, the conventional bypass transfer switching device described above has following problems.

First, when the administrator switches the bypass switch 20 into the normal supply or the alternative supply in order to perform maintenance, repair, testing, etc. of the automatic transfer switch, without recognizing that the bypass switch 20 is switched, the administrator or an operator may input the lever into the lever input portion 10a to manually switch a power supply of the automatic transfer switch 10, so there is a problem causing a fire accident in addition to a damage of an apparatus such as a power supply apparatus, etc. The bypass transfer switching device does not have a problem when an input power supply of the bypass switch 20 and an input power supply of the automatic transfer switch match with each other. However, when the operator performs manual switching of the automatic transfer switch through the lever input portion 10a from carelessness in the state in which the input power supply of the bypass switch 20 and the input power supply of the automatic transfer switch do not match with each other, there may be a problem causing a large accident.

Second, in a process that the administrator draws the automatic transfer switch 10 from the switchboard in a state in which a power supply is bypassed using the bypass switch 20 and performs testing or maintenance of the automatic transfer switch 10 and then returns the automatic transfer switch 10 to the switchboard, when an input power supply of the bypass switch 20 and an input power supply of the automatic transfer switch 10 do not match with each other, the bypass transfer switching device may have a problem of causing the above-described accidents. The administrator performs testing or maintenance while drawing the automatic transfer switch 10 from the switchboard 30 and then inputting the normal supply or the alternative supply to the automatic transfer switch 10. When the operator returns the automatic transfer switch 10 into the switchboard 30 after completion of a series of operations, mismatch between the input power supply of the automatic transfer switch 10 and the input power supply of the bypass switch 20 may lead to an accident such as a damage of an apparatus and a fire accident.

SUMMARY OF THE INVENTION

Accordingly, the present disclosure has been made keeping in mind the above problems occurring in the related art, and the present disclosure is intended to provide an interlock structure of a bypass transfer switching device, wherein when supply power is bypassed through a bypass switch, a lever input portion of an automatic transfer switch is automatically closed to fundamentally prevent manual switching of the automatic transfer switch.

In order to achieve the above object, according to one aspect of the present disclosure, there is provided an interlock structure of a bypass transfer switching device. The interlock structure of the bypass transfer switching device includes: an automatic transfer switch having a lever input portion of a through hole shape for manual switching of a normal supply and an alternative supply; a bypass switch configured to bypass electric power of the normal supply or the alternative supply supplied to a load side through the automatic transfer switch, the bypass switch including a bypass lever capable of manually switching a bypass circuit; and an interlock device configured to automatically close the lever input portion when the bypass lever is operated, wherein the interlock device may include: a main link coupled to the bypass lever, and configured to be lowered to a lower portion of a shaft of the bypass lever regardless of a turning direction of the bypass lever when the bypass lever is turned; an elevation member provided to be operated in conjunction with a raising and lowering operation of the main link; an elastic link configured to have elasticity allowing the elastic link to rotate toward the elevation member, and shaft-coupled to a lower portion of the elevation member in a close contact state with the lower portion of the elevation member; and an opening and closing plate shaft-coupled to the elastic link, and configured to open and close the lever input portion while being raised and lowered toward the lever input portion by a turning operation of the elastic link.

The automatic transfer switch may have a fixed bracket, a first end of the elastic link may be shaft-coupled to the fixed bracket through an elastic member, a second end of the elastic link may be shaft-coupled to the opening and closing plate, and at a portion between the first end and the second end of the elastic link, a contact bar being in close contact with the elevation member may be formed by protruding from the elastic link toward a first side of the elastic link.

A lower surface of the elevation member may include a straight line portion pressing the contact bar while being in contact with the contact bar and an inclined portion inclined upward from an end of the straight line portion toward the front of the automatic transfer switch.

The main link may include: a first link having a first end shaft-coupled to the lower portion of the bypass lever, and configured to be turned on the first end thereof in a direction opposite to a rotating direction of the bypass lever; and a second link shaft-coupled to a portion located between a second end of the first link and the elevation member, and configured to be turned downward on the second end of the first link by turning of the first link.

An interlock structure of a bypass transfer switching device according to the present disclosure is configured to automatically close a lever input portion of an automatic transfer switch when supply power is bypassed through a bypass switch. Therefore, it is possible to fundamentally prevent an operator from manually switching power supplies of the automatic transfer switch. Accordingly, the present disclosure has an effect that a damage to an apparatus at a load side or a fire accident due to mismatch between an input power supply of the bypass switch and a input power supply of the automatic transfer switch does not occur during repair and testing of the automatic transfer switch.

Furthermore, the interlock structure of the present disclosure is configured such that, when supply power is bypassed through the bypass switch, the automatic transfer switch may be input into a switchboard only when a power input direction of the automatic transfer switch drawn from the switchboard and a power input direction of the bypass switch match with each other. Accordingly, damage to an apparatus and an accident due to mismatch between the input power of the bypass switch and the input power of the automatic transfer switch can be prevented.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

It should be noted that the terms and words used in the specification and the claims should not be construed as being limited to ordinary meanings or dictionary definitions. Meanwhile, the embodiments described in the specification and the configurations illustrated in the drawings are merely examples and do not exhaustively present the technical spirit of the present disclosure.

Hereinbelow, an interlock structure of the bypass transfer switching device (hereinbelow, the interlock structure of the bypass transfer switching device refers to 'the interlock structure') according to an exemplary embodiment of the present disclosure will be described with reference to FIGS. 3 to 9.

Figure 3:
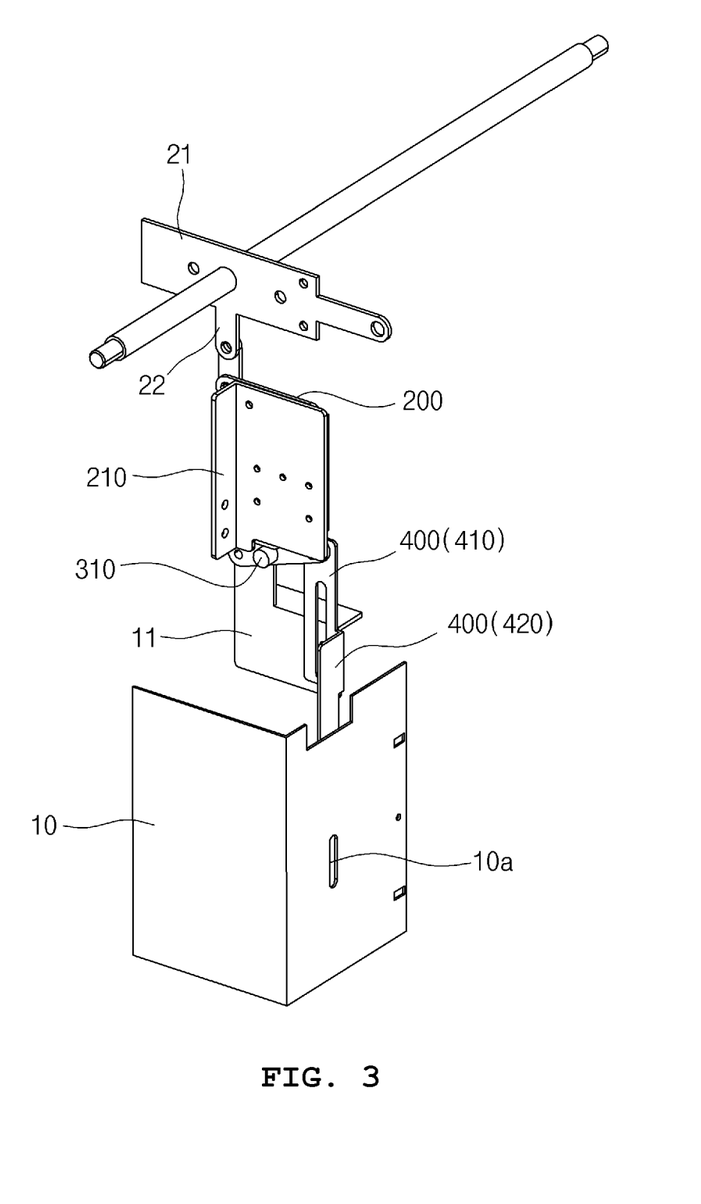
FIG. 3 is a view taken from a first side, the view showing a main portion of an interlock structure of the bypass transfer switching device according to an exemplary embodiment of the present disclosure.
Figure 6A:
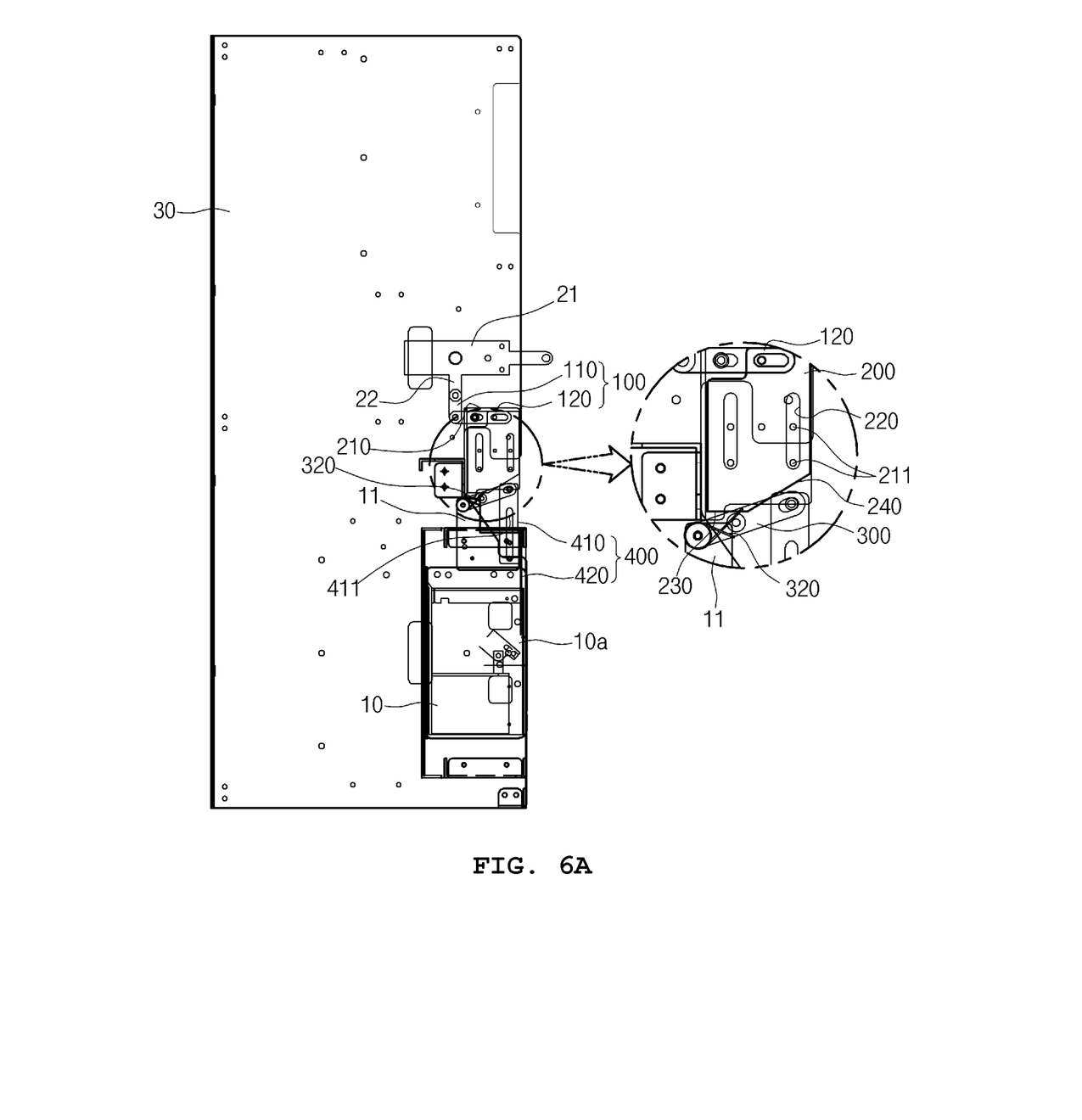
FIGS. 6A and 6B are a side view and a front view showing the interlock structure of the bypass transfer switching device with an automatic transfer switch in an operated state according to the exemplary embodiment of the present disclosure.
Figure 7:
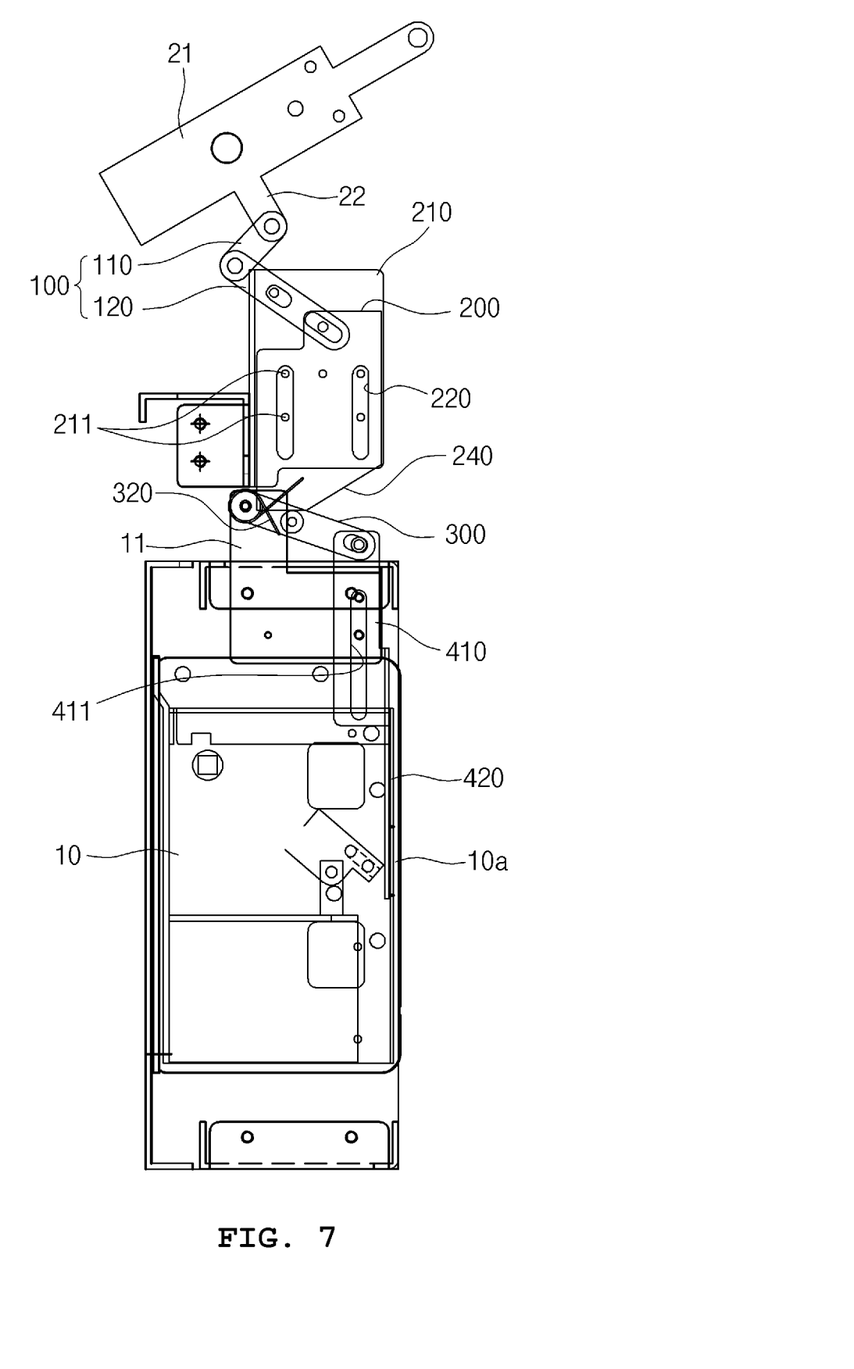
FIG. 7 is a side view showing the interlock structure of the bypass transfer switching device according to the exemplary embodiment of the present disclosure in a state in which power is bypassed to a normal supply through a bypass switch.
Figure 8:
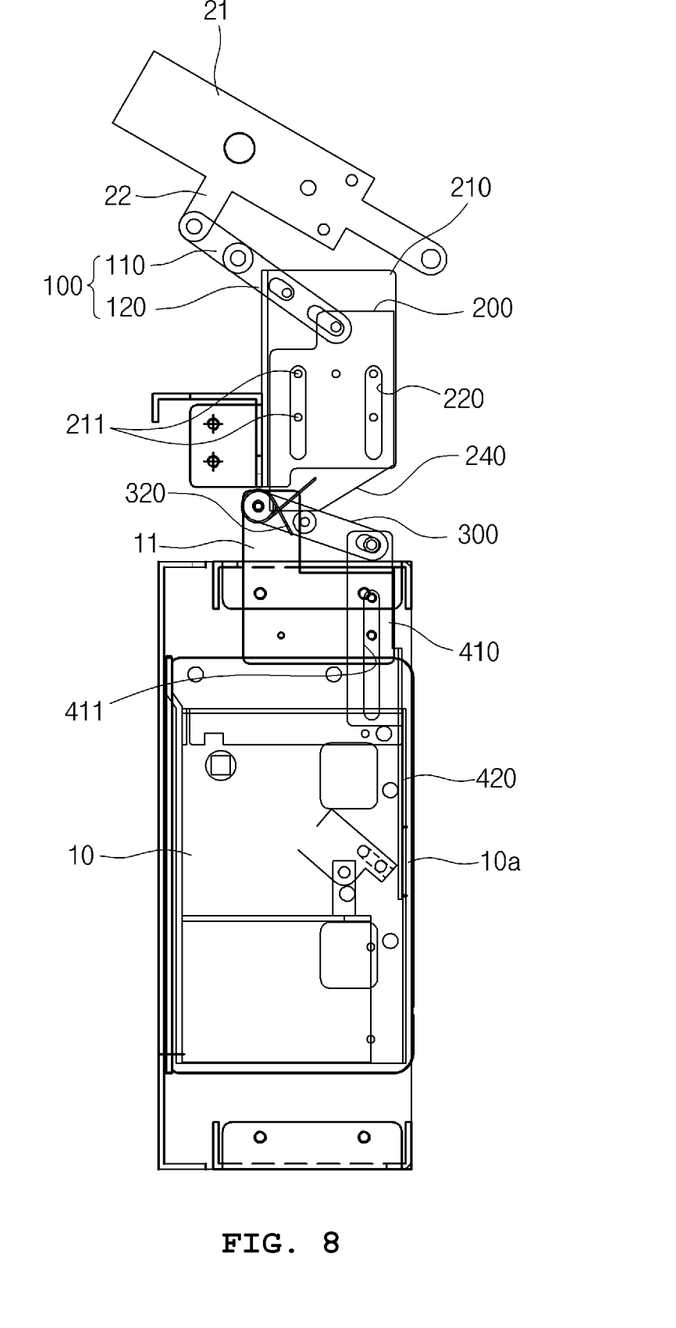
FIG. 8 is a side view showing the interlock structure of the bypass transfer switching device according to the exemplary embodiment of the present disclosure in a state in which power is bypassed to an alternative supply through the bypass switch.

With the bypass transfer switching device in which an automatic transfer switch 10 and a bypass switch 20 are connected to each other in parallel, the interlock structure includes an interlock device capable of closing a lever input portion 10a formed in the automatic transfer switch 10, as shown in FIG. 3. The bypass switch 20 includes a bypass lever 21 capable of switching an input direction of the bypass switch 20, the bypass lever 21 is provided to be turned upward and downward in a switchboard 30, as shown in FIGS. 6A, 7, and 8. For example, when the bypass lever 21 is turned upward in the switchboard 30, a normal supply is bypassed to the bypass switch 20, and when the bypass lever 21 is turned downward in the switchboard 30, an alternative supply is bypassed to the bypass switch. The bypass lever 21 includes an interlock bar 22 protruding downward from a rotary shaft in a direction perpendicular to the rotary shaft. The interlock bar is provided for a coupling with a main link, which will be described later.

Figure 4:
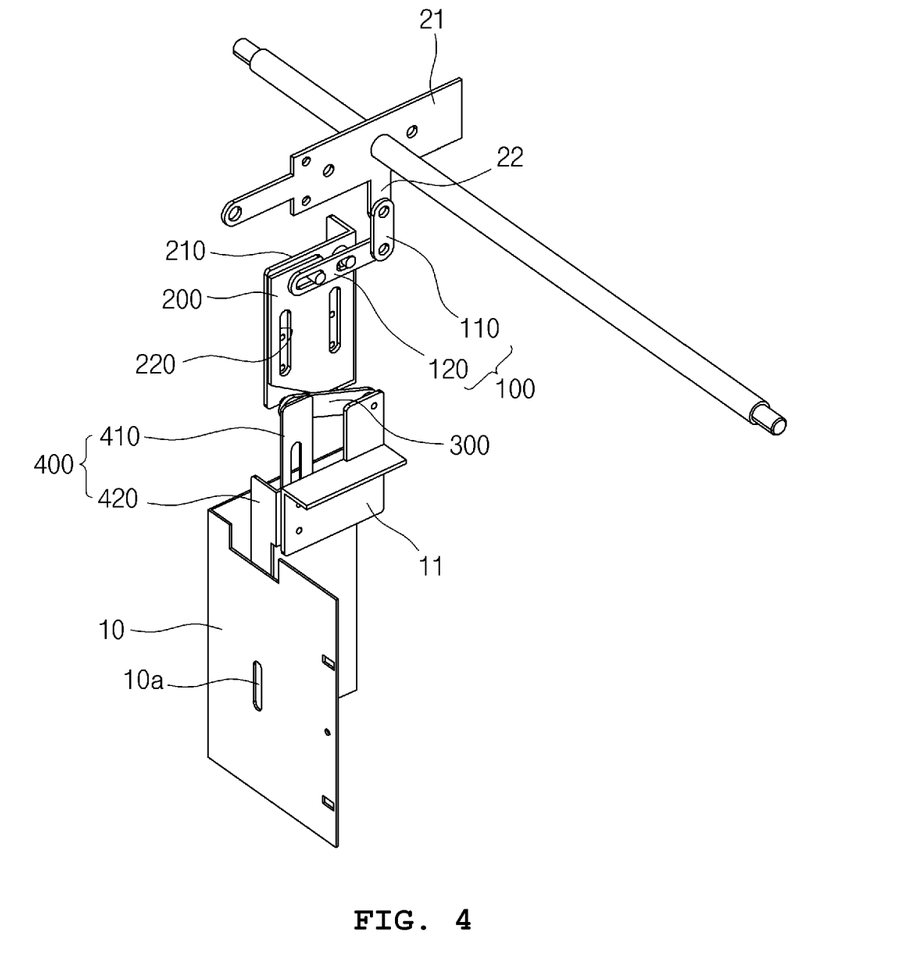
FIG. 4 is a view taken from a second side, the view showing the main portion of the interlock structure of the bypass transfer switching device according to the exemplary embodiment of the present disclosure.
Figure 5:
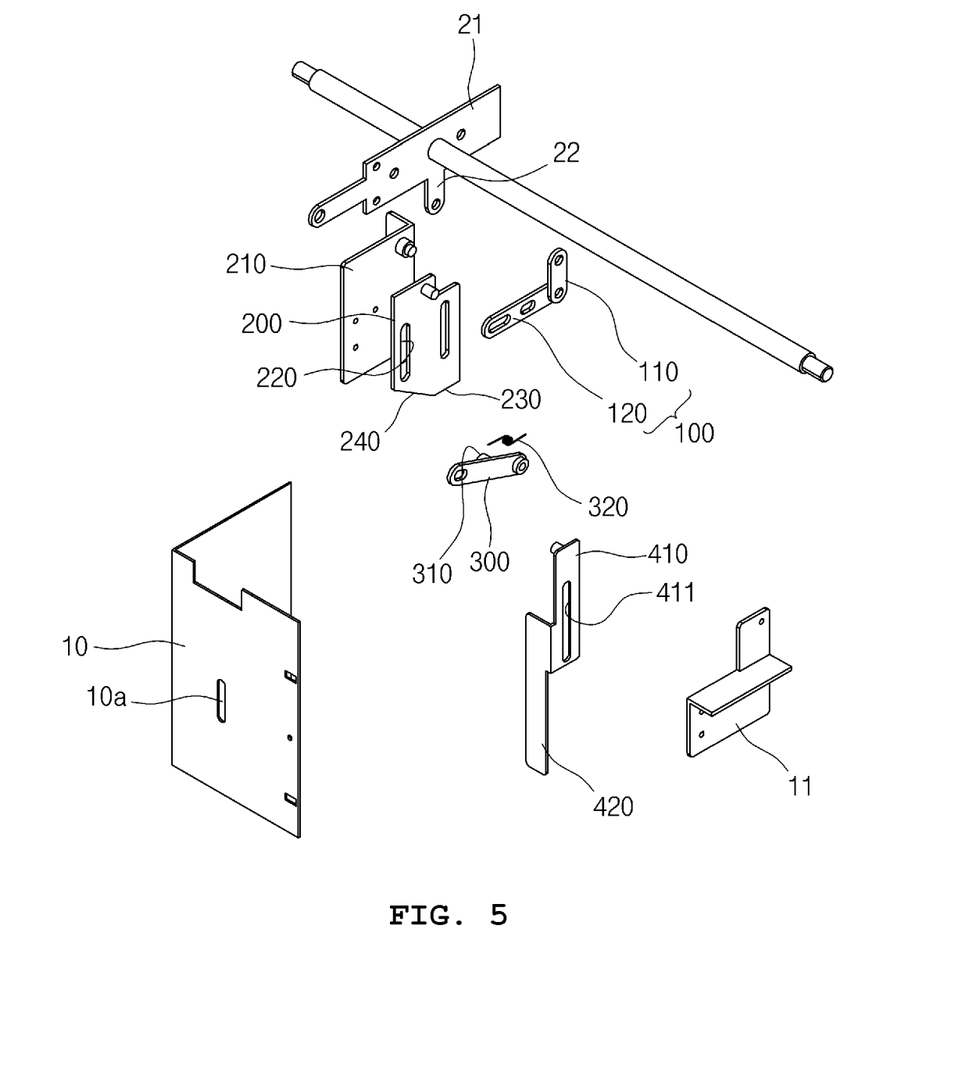
FIG. 5 is an exploded view taken from the second side, the view showing the interlock structure of the bypass transfer switching device according to the exemplary embodiment of the present disclosure.

As shown in FIGS. 3 to 5, the interlock device includes the main link 100, an elevation member 200, an elastic link 300, and the opening and closing plate 400.

The main link 100 transmits a turning operation of the bypass lever 21 to the opening and closing plate 400. The main link 100 is provided between the bypass lever 21 and the elevation member 200, as shown in FIG. 4. The main link 100 is shaft-coupled to the interlock bar 22 of the bypass lever 21, and may be moved downward to a lower side of the bypass lever 21 regardless of a turning or counter-turning direction of the bypass lever 21. Preferably, the main link 100 includes two links coupled to each other, and the two links refer to a first link 110 and a second link 120 for convenience of description. A first end of the first link 110 is shaft-coupled to the interlock bar 22 of the bypass lever 21 and the first link 110 is counter-turned on the first end thereof to the turning direction of the bypass lever 21. For example, the first link 110 is configured such that, when the bypass lever 21 is turned counterclockwise, the first link 110 is turned clockwise as shown in FIG. 7, and when the bypass lever 21 is turned clockwise, the first link 110 is turned as shown in FIG. 8. The second link 120 is shaft-coupled to a second end of the first link 110 and is turned downward on the second end of the first link 110 to a lower side of the switchboard 30. The second link 120 is shaft-coupled to a location between the second end of the first link 110 and the elevation member 200. Regardless of the turning direction of the bypass lever 21, when the bypass lever 21 is turned, the second link 120 is turned on the second end of the first link 110 to the lower side of the switchboard 30.

The elevation member 200 is operated in conjunction with the main link 100 and serves to turn downward the elastic link 300, which will be described later. As shown in FIG. 4, the elevation member 200 is coupled to the second link 120 so as to be operated in conjunction with the second link 120. Preferably, the elevation member 200 has a guide plate 210 so that a raising and lowering operation of the elevation member 200 is efficiently performed without path deviation. The guide plate 210 is provided inside the switchboard 30 and has guide protrusions 211 provided to guide an elevation path of the elevation member 200. The elevation member 200 has a longitudinal guide hole 220 corresponding to the guide protrusions 211, whereby the elevation member 200 is raised and lowered on the guide plate 210 and is raised and lowered along the guide protrusions 211. Meanwhile, a lower surface of the elevation member 200 is divided into a straight line portion 230 and an inclined portion 240. The straight line portion 230 is a portion pressing the elastic link 300, which will be described later, during the raising and lowering operation of the elevation member 200. The straight line portion 230 has a shape that is a straight line with respect to the ground. The inclined portion 240 is configured to raise the opening and closing plate 400 while guiding naturally a turning operation of the elastic link 300 when the automatic transfer switch 10 is drawn from the switchboard 30. A detailed description of the operation of the inclined portion 240 will be described later. As shown in FIGS. 4 and 5, the inclined portion 240 is formed to be inclined upward from the straight line portion 230 toward the front of the switchboard 30.

The elastic link 300 is configured to directly raise the opening and closing plate 400 and may be turned by the raising and lowering operation of the elevation member 200. The elastic link 300 is provided at the automatic transfer switch 10. Specifically, a fixed bracket 11 is provided on the automatic transfer switch 10 as shown in FIG. 7, and the elastic link 300 may be turned on the fixed bracket 11. A first end of the elastic link 300 is shaft-coupled to the fixed bracket 11 and a second end thereof is shaft-coupled to an upper end of the opening and closing plate 400. With the above-described configuration, the second end of the elastic link 300 is turned on the first end thereof at the fixed bracket 11, thereby raising and lowering the opening and closing plate 400 provided on the second end of the elastic link 300. A contact bar 310 is provided between the first end and the second end of the elastic link 300. The contact bar 310 is in close contact with the lower surface of the elevation member 200 and is a configuration in which the elastic link 300 is actually pressed when the elevation member 200 is lowered. The contact bar 310 protrudes from the elastic link 300 toward a first side of the elastic link 300. Meanwhile, an elastic member 320 is provided on the first end of the elastic link 300. The elastic member 320 supplies an elastic force to turning of the elastic link 300. The elastic force of the elastic member 320 causes a force of the elastic link 300 to be turned toward the elevation member 200. In other words, the elastic link 300 supplies the elastic force toward the elevation member 200 through the elastic member 320. With the configuration of the elastic member 320, in the present disclosure, the opening and closing plate 400 may operate efficiently and flexibly an operation of closing and opening a lever input portion 10a. Preferably, the elastic member 320 is a torsion spring.

The opening and closing plate 400 serves to open and close the lever input portion 10a of the automatic transfer switch 10. The opening and closing plate 400 is shaft-coupled to the second end of the elastic link 300 as shown in FIG. 6A. The opening and closing plate 400 is raised and lowered toward the lever input portion 10a and to be operated in conjunction with a turning operation of the elastic link 300. Preferably, the opening and closing plate 400 consists of a connecting portion 410 coupled to the elastic link 300 and a covering portion 420 covering the lever input portion 10a. The connecting portion 410 has a longitudinal hole 411 formed in a longitudinal direction of the connecting portion 410, and the fixed bracket 11 has guide protrusions 11a that may be located in the longitudinal hole 411.

Hereinbelow, the operation of the interlock structure having the above-described structure will be described.

Figure 6B:
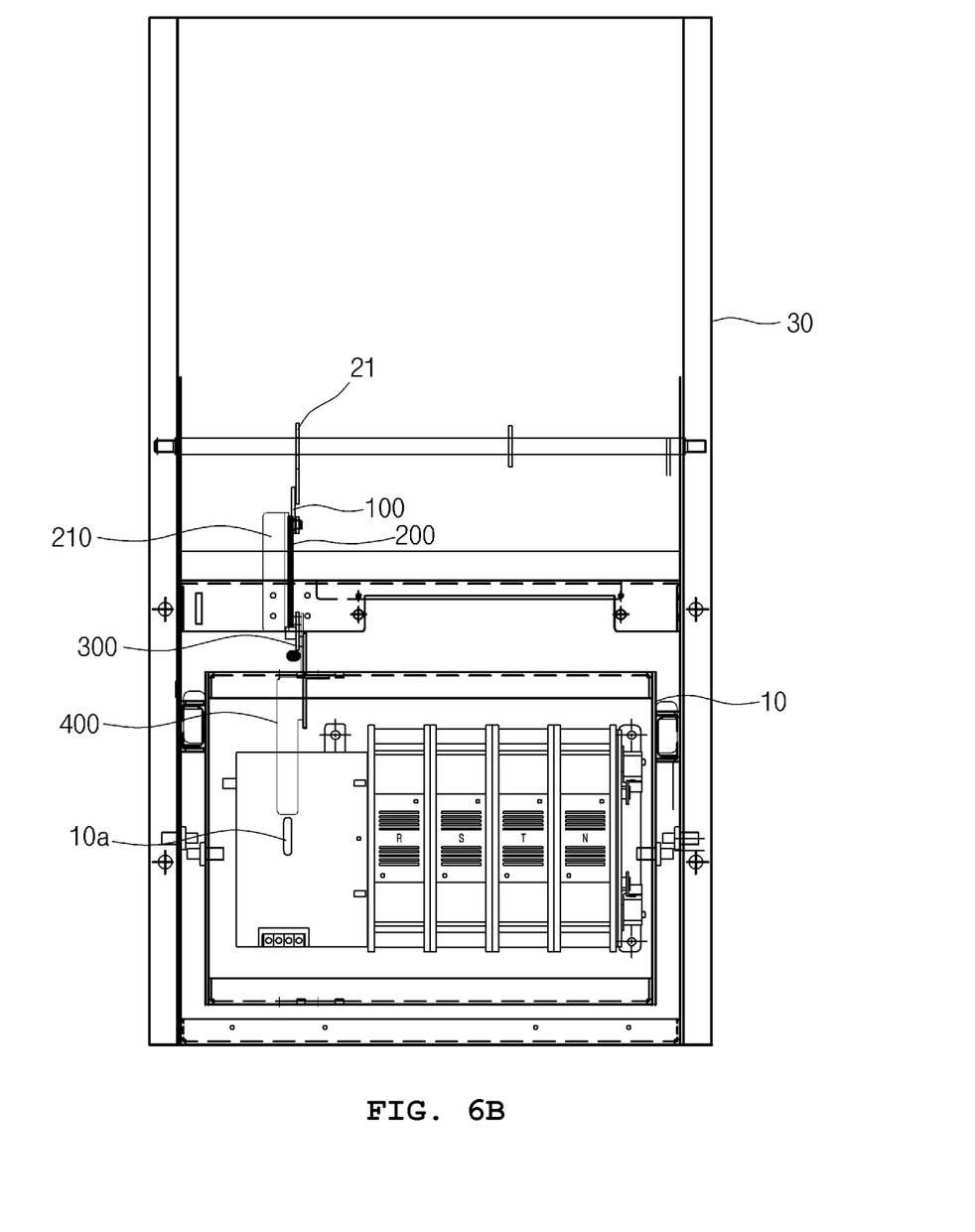

FIGS. 6A and 6B are a side view and a front view showing an operating state the automatic transfer switch 10 in a state in which power is normally supplied. As shown in the drawings, the bypass lever 21 is in a state in which the bypass lever 21 is not connected to any power supply of the bypass switch 20. The lever input portion 10a is in an open state so that manual switching of the automatic transfer switch 10 may be performed. When the automatic transfer switch 10 in the above-described open state of the lever input portion 10a needs maintenance, testing, etc., an operator bypasses a power supply, which is supplied through the automatic transfer switch 10, through the bypass switch 20.

For example, as shown in FIG. 7, the operator turns the bypass lever 21 upward to bypass the normal supply from the automatic transfer switch 10 to the bypass switch 20. The bypass lever 21 is turned counterclockwise on a shaft and the first link 110 is turned clockwise on the interlock bar 22. The second link 120 is turned on the second end of the first link 110 and the second link 120 in a horizontal state is turned downward, whereby the elevation member 200 is lowered along the guide plate 210.

When the elevation member 200 is lowered, the contact bar 310 that is in closed contact with the straight line portion of the elevation member 200 is lowered while being pressed by the elevation member 200. Eventually, the elastic link 300 is turned on the fixed bracket 11 to lower the second end thereof as shown in FIGS. 6A and 7. The elastic link 300 is in a state in which the elastic link 300 is pressed by the elevation member 200 and is returned to an initial location thereof by an elastic force of the torsion spring 320. As described above, the second end of the elastic link 300 is lowered by the turning operation of the elastic link 300, whereby the opening and closing plate 400 connected to the second end of the elastic link 300 is lowered to close the lever input portion 10a.

Meanwhile, FIG. 8 is a view showing a state in which the bypass lever 21 is turned to bypass the supply power to the alternative supply, and the view showing a state in which an operator turns the bypass lever 21 clockwise. The first link 110 is turned counterclockwise on the interlock bar 22 as shown in FIGS. 6A and 8, and turns the second link 120 clockwise. Therefore, the second link 120 is in a straight line with the first link 110 and the second end of the second link 120 is lowered to lower the elevation member 200.

When the elevation member 200 is lowered, the contact bar 310 that is in close contact with the straight line portion 230 of the elevation member 200 is lowered while being pressed by the elevation member 200 as shown in FIG. 7. Therefore, the elastic link 300 is turned on the fixed bracket 11 and lowers the second end thereof as shown in FIGS. 6A and 8. The elastic link 300 is in a state in which the elastic link 300 is pressed by the elevation member 200 and is returned to the initial location thereof by an elastic force of the torsion spring 320. As described above, the second end of the elastic link 300 is lowered by the turning operation of the elastic link 300, whereby the opening and closing plate 400 connected to the second end of the elastic link 300 is lowered to close the lever input portion 10a.

As described above, according to the present disclosure, when the bypass lever 21 is turned to bypass the supply power, the opening and closing plate 400 is automatically lowered to close the lever input portion 10a. Therefore, in the state that the supply power is bypassed, it is impossible for the operator to manually switch the automatic transfer switch 10 through the lever input portion 10a regardless of an input power location of the bypass lever 21.

Figure 9:
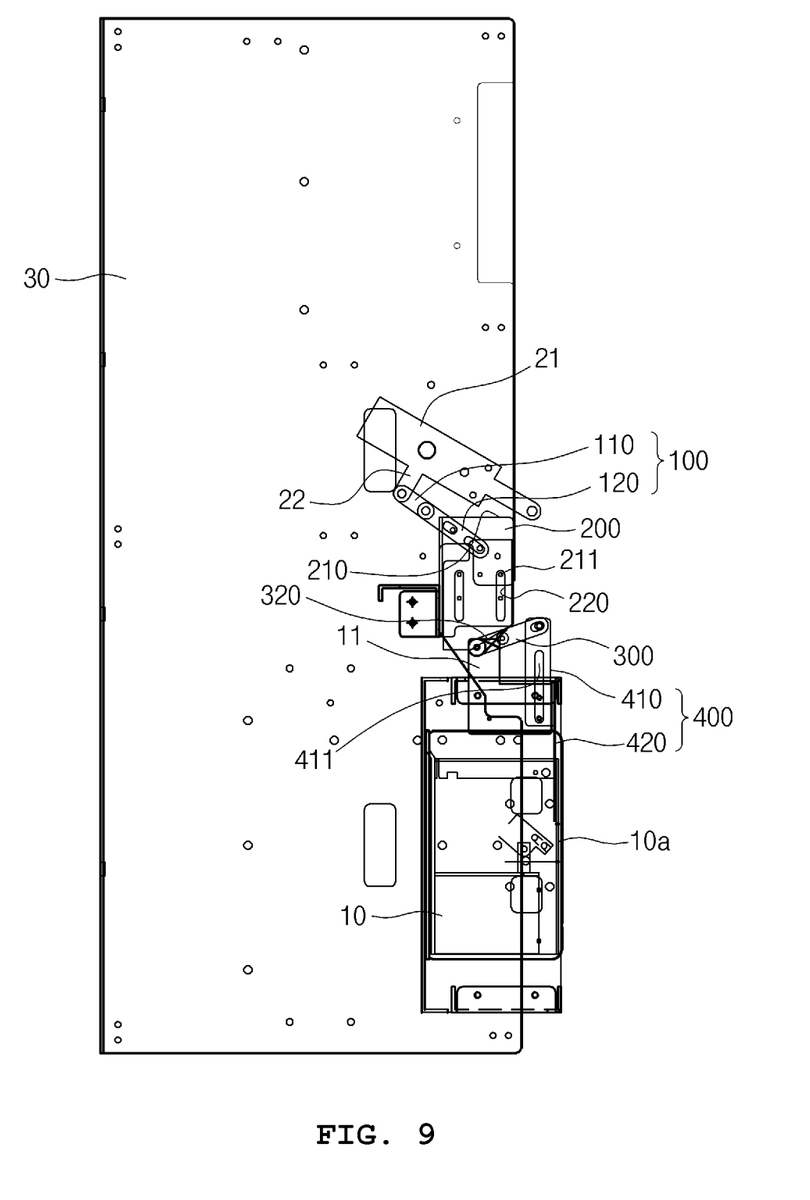
FIG. 9 is a view showing a state in which the automatic transfer switch is drawn from the switchboard while power is bypassed to the alternative supply through the bypass switch.

Meanwhile, FIG. 9 is a view showing a state in which the operator bypasses the supply power and then draws the automatic transfer switch 10 from the switchboard 30 for testing the automatic transfer switch 10. According to the present disclosure, when the operator removes the automatic transfer switch 10 from the switchboard 30, the opening and closing plate 400 is automatically raised to open the lever input portion 10a. According to the present disclosure, when the automatic transfer switch 10 is drawn from the switchboard 30 in a state in which the supply power is bypassed, the closed lever input portion 10a is automatically opened, whereby the operator may switch a power supply through the lever input portion 10a without a separate process and may perform efficiently a testing operation.

A series of process as described above will be described with reference to FIGS. 8 and 9.

FIG. 8 is a view showing a state in which the alternative supply is bypassed as described above. The lever input portion 10a of the automatic transfer switch 10 is in a closed state by a lowering of the opening and closing plate 400. The operator pulls the automatic transfer switch 10 to the front of the switchboard 30 to remove the automatic transfer switch 10. The elastic link 300 is provided on the fixed bracket 11, thereby being drawn with the automatic transfer switch 10. The contact bar 310 of the elastic link 300 that is pressed in close contact with the straight line portion 230 of the elevation member 200 is moved along the straight line portion 230 and passes through the straight line portion 230 to meet the inclined portion 240. The contact bar 310 is guided along the inclined portion 240. Therefore, as shown in FIG. 9, the elastic link 300 is turned upward at an angle corresponding to the inclined portion 240. The elastic link 300 is turned counterclockwise on the drawings, whereby the second end of the elastic link 300 raises the opening and closing plate 400 while being raised so that the lever input portion 10a is opened. Then, the operator switches the automatic transfer switch 10 through the lever input portion 10a to perform the testing operation. When the testing operation of the automatic transfer switch 10 is completed, the operator pushes the automatic transfer switch 10 into the switchboard 30 so that the automatic transfer switch 10 is returned to an initial location thereof. Accordingly, when the contact bar 310 of the elastic link 300 is moved by being guided along the inclined portion 240 and reaches the straight line portion 230, the opening and closing plate 400 is lowered again, so that the lever input portion 10a of the automatic transfer switch 10 input into the switchboard 30 is closed again.

As described above, in the interlock structure of the bypass transfer switching device according to the present disclosure, when the supply power is bypassed, the lever input portion of the automatic transfer switch is automatically closed, and when the automatic transfer switch is drawn from the switchboard when the supply power is bypassed, the lever input portion may be automatically opened. Accordingly, the interlock structure of the present disclosure prevents a safety accident by fundamentally preventing the automatic transfer switch from being manually switched when the supply power is bypassed. In addition, the interlock structure may increase work convenience by the lever input portion automatically opened when the automatic transfer switch is drawn from the switchboard.

Although a preferred embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. An interlock structure of a bypass transfer switching device, the interlock structure comprising:
    an automatic transfer switch having a lever input portion of through-hole shape for manual switching of a normal supply and an alternative supply;
    a bypass switch configured to bypass electric power of the normal supply or the alternative supply supplied to a load side through the automatic transfer switch, the bypass switch comprising a bypass lever for manually switching a bypass circuit; and
    an interlock device configured to automatically close the lever input portion when the bypass lever is operated,
    wherein the interlock device comprises:
    a main link coupled to the bypass lever, and configured to be lowered to a lower portion of a shaft of the bypass lever regardless of a turning direction of the bypass lever when the bypass lever is turned;
    an elevation member for operating in conjunction with a raising and lowering operation of the main link;

an elastic link comprising an elastic member having elasticity, the elastic member enabling the elastic link to rotate toward the elevation member, and shaft-coupled to a lower portion of the elevation member in a close contact state with the lower portion of the elevation member; and an opening and closing plate shaft-coupled to the elastic link, and configured to open and close the lever input portion while being raised and lowered toward the lever input portion by a turning operation of the elastic link.

2. The interlock structure of claim 1, wherein the main link comprises:
 a first link having a first end shaft-coupled to a lower portion of the bypass lever, and configured to be turned on the first end thereof in a direction opposite to a rotating direction of the bypass lever; and
 a second link shaft-coupled to a portion located between a second end of the first link and the elevation member, and configured to be turned downward on the second end of the first link by a turning of the first link.

3. The interlock structure of claim 1, wherein the automatic transfer switch has a fixed bracket,
 a first end of the elastic link is shaft-coupled to the fixed bracket through the elastic member,
 a second end of the elastic link is shaft-coupled to the opening and closing plate, and
 at a portion between the first end of the elastic link and the second end of the elastic link, a contact bar being in close contact with the elevation member protrudes from the elastic link toward a first side of the elastic link.

4. The interlock structure of claim 3, wherein the main link comprises:
 a first link having a first end shaft-coupled to the lower portion of the bypass lever, and configured to be turned on the first end thereof in a direction opposite to a rotating direction of the bypass lever; and
 a second link shaft-coupled to a portion located between a second end of the first link and the elevation member, and configured to be turned downward on the second end of the first link by a turning of the first link.

5. The interlock structure of claim 3, wherein a lower surface of the elevation member comprises a straight line portion pressing the contact bar while being in contact with the contact bar and an inclined portion inclined upward from an end of the straight line portion toward a front portion of the automatic transfer switch.

6. The interlock structure of claim 5, wherein the main link comprises:
 a first link having a first end shaft-coupled to the lower portion of the bypass lever, and configured to be turned on the first end thereof in a direction opposite to a rotating direction of the bypass lever; and
 a second link shaft-coupled to a portion located between a second end of the first link and the elevation member, and configured to be turned downward on the second end of the first link by a turning of the first link.

* * * * *